United States Patent Office 3,833,723
Patented Sept. 3, 1974

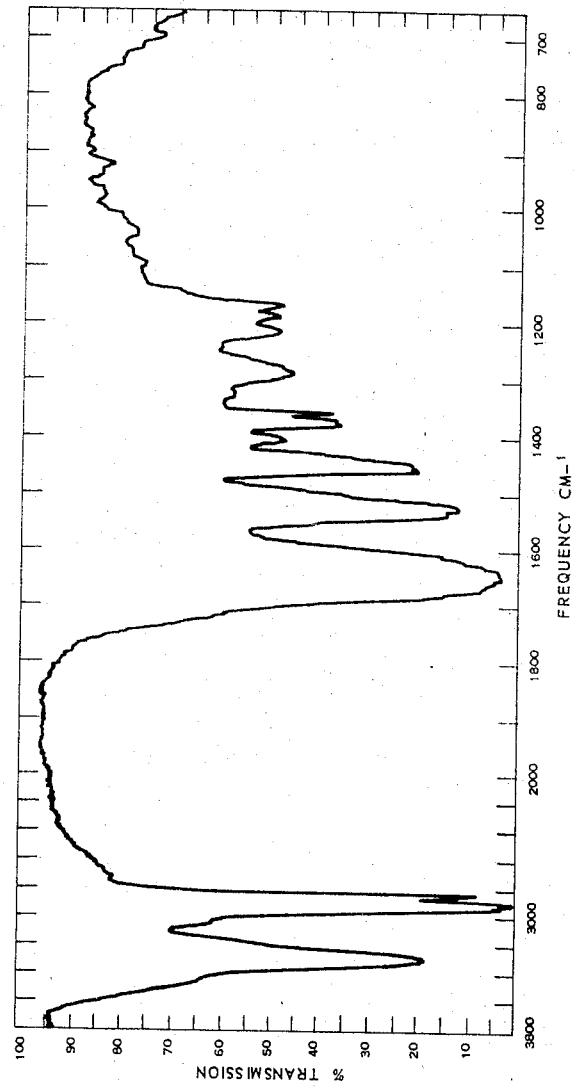

3,833,723
ALAMETHICIN AND PRODUCTION THEREFOR
John H. Coats, Kalamazoo, Curtis E. Meyer, Galesburg, and Fritz Reusser, Portage, Mich., assignors to The Upjohn Company, Kalamazoo, Mich.
Filed Dec. 29, 1965, Ser. No. 527,635
Int. Cl. A61k 21/00
U.S. Cl. 424—118                    10 Claims

ABSTRACT OF THE DISCLOSURE

This invention relates to new compound, alamethicin and to the process for the production thereof by culturing Trichoderma viride NRRL 3199.

---

This invention relates to a novel composition of matter and to a process for the production thereof. More particularly, this invention relates to a new compound, alamethicin (U–22,324), and to a process for the production thereof.

Alamethicin is an organic compound producibly by culturing an alamethicin-producing Trichoderma viride in an aqueous nutrient medium under aerobic conditions. It has the property of adversely affecting the growth of Gram-positive bacteria, for example, Bacillus subtilis, Bacillus cereus, Staphylococcus aures, Sarcina lutea, and Salmonella gallinarum. Accordingly, alamethicin can be used alone or in combination with other antibacterial agents to prevent the growth of, or reduce the number of, such organisms present in various environments, for example, in plants, and in animals such as mammals, birds, fish, and reptiles, and humans, where the infecting microorganism is susceptible to the antibiotic. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays and other microbiological media. Alamethicin readily forms suds, and, thus, can be used as a biodegradable detergent.

Alamethicin also inhibits the growth of KB cells (human epidermoid carcinoma cells) in tissue culture tests.

THE MICROORGANISM

The Tricholerma used according to this invention for the production of alamethicin is a newly-isolated strain of the known microorganism Trichoderma viride. The strain of Trichoderma viride which elaborates alamethicin, under the fermentation conditions hereinafter disclosed, has been deposited with, and can be obtained from the permanent collection of the Northern Utilization and Research Division, Agricultural Research Service, U.S. Department of Agriculture, Peoria, Ill., U.S.A. Its accession number in this repository is NRRL 3199.

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example an assimilable carbohydrate, and a nitrogen source, for example, and assimilab'e nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to staisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the basic side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganisms for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an acidic polypeptide compound. Alamethicin is soluble in methanol, ethanol, and like alcohols; chloroform, methlene chloride, and like halogenated hydrocarbons; acetone, methyl ethyl ketone, isopropyl butyl ketone, and like lower alkanones; it is slightly soluble in ethyl acetate, amy acetate, butyl acetate, and like aliphatic esters; and relatively insoluble in its free acid form in water. However, the sodium salt of alamethicin is very water-soluble.

A variety of procedures can be employed in the isolation and purification of alamethicin, for example, solvent extraction, liquid-liquid distribution in a Craig apparatus, the use of adsorbents, and crystallization from solvents. Alamethicin can be recovered from the fermentation medium by adsorption on charcoal at a pH below 7, preferably around 3 to 4, and then elution with a solvent, for example, 50% aqueous acetone. Alamethicin can then be recovered from the acetone extract in the manner hereinafter described. An alternative method for the recovery of alamethicin from the fermentation medium is to concentrate filtered fermentation beer under reduced pressure and then lower the pH to about 3 to 4 to induce the precipitation of alamethicin. The crude alamethicin obtained from this procedure can then be purified by using the procedures hereinafter described. A further alternative for the recovery of alamethicin from fermentation medium is to extract the filtered fermentation beer with a lower alcohol, for example, 1-butanol, and then recover alamethicin by the removal of the butanol on a still. The alamethicin thus recovered can be purified further using the procedure hereinafter described. In a preferred recovery process, the mycelium from an alamethicin fermentation is separated from the broth by conventional means such as by filtration or centrifugation. The clarified beer is then lowered to an acidic pH with a mineral acid, for example hydrochloric acid, a filter aid, for example diatomaceous earth, is added and the slurry filtered. The cake from the filtration is extracted with a lower alkanone (acetone is preferred). The acetone extracts are collected and concentrated to an aqueous at reduced pressure. The aqueous is then freeze-dried to yield a dry preparation of alamethicin. This preparation can be used alone or readily mixed with other antibiotic agents for use in environments where a higher degree of purity of the alamethicin is not essential.

High purity alamethicin can be obtained by subjecting an impure preparation of alamethicin, as obtained above, to purification procedures as follows: The impure alamethicin can be purified by direct crystallization by dissolving alamethicin in a warm lower alcohol, for example 95% ethanol, and allowing the solution to cool slowly. Crystallization of alamethicin then occurs. Some impure preparations of alamethicin may require upgrading by extraction of materials which interfere with crystallization. Solvents such as diethyl ether, methyl isobutyl ketone, or ethyl acetate, amyl acetate, butyl acetate, and like aliphatic esters can be used to remove the interfering materials. The extracted preparation of impure alamethicin can then be crystallized from a lower alkanone or a lower alcohol as defined above. The addition of water decreases the solubility of alamethicin in these solvents, thus affording better recovery. Also, the addition of diethyl ether to an alcohol solution of alamethicin reduces its solubility and induces crystallization.

Salts of alamethicin are formed employing the free acid of alamethicin and an inorganic or organic base. The alamethicin salts can be prepared, as for example, by dissolving alamethicin free acid in alcohol, adding an equimolar amount of a dilute base until the pH of the solution is about 7 to 8, and freeze-drying the solution to provide a dried residue consisting of the alamethicin salt. Alamethicin salts which can be formed include the ammonium, sodium, potassium, and calcium salts. Other salts of alamethicin, including those with organic bases such as primary, secondary, and tertiary monoamines, as well as with polyamines, also can be formed using the above-described or other commonly employed procedures. Other valuable salts are obtained with therapeutically effective bases which impart additional therapeutic effects thereto. Such bases are, for example, the purine bases such as theophylline, theobromine, caffeine, or derivatives of such purine bases; antihistaminic bases which are capable of forming salts with weak acids; pyridine compounds such as nicotinic acid amide, isonicotinic acid hydrazide, and the like; phenylalkyl amines such as adrenaline, ephedrine, and the like; choline, and others. Salts of alamethicin can be used for the same biological purposes as the free acid.

Alamethicin can be used to control *S. gallinarum* in livestock and poultry, and *S. aureus* on washed and stacked food utensils. It also can be used as a disinfectant on various dental and medical equipment contaminated with *S. aureus*.

The following examples are illustrative of the process and products of the present invention but are not to be construed as limiting. All percentages are by weight and all solvent mixture proportions are by volume unless otherwise noted.

EXAMPLE 1

(A) Fermentation

A soil stock of *Trichoderma viride*, NRRL 3199, was used to inoculate a series of 500-ml. Erlenmeyer flasks containing 100 ml. of sterile seed medium consisting of the following ingredients:

| | G./liter |
|---|---|
| Glucose monohydrate | 25 |
| Pharmamedia [1] | 25 |
| Tap water, q.s. 1 liter. | |

[1]Pharmedia is an industrial grade of cottonseed flour produced by Trader's Oil Mill Company, Fort Worth, Tex.

The flasks were incubated at 28° C. for 3 days on a Gump rotary shaker operating at 250 r.p.m.

A portion of the seed inoculum (5 ml.), described above, was used to inoculate each of a series of 500-ml. Erlenmeyer flasks, each containing 100 ml. of sterile fermentation medium consisting of the following ingredients:

| | G./liter |
|---|---|
| Black strap molasses | 20 |
| Dextrin | 30 |
| Fish meal | 15 |
| Pharmamedia | 15 |

The fermentation flasks were incubated at 25° C. for 5 days on a Gump rotary shaker operating at 250 r.p.m.

The titer of alamethicin in the fermentation beer is ascertained by periodically testing the fermentation beer using a microbiological assay. The assay is conducted against the organism *Sarcina lutea* on medium Seed Agar (Baltimore Biological Laboratory, Baltimore, Md.). The medium is seeded with the test organism at a rate of 0.5 ml. of an overnight culture per 1000 ml. of agar. The plates are incubated at 30° C. overnight. A typical alamethicin fermentation assayed as follows:

| Days of fermentation: | Assay, BU/ml. |
|---|---|
| 1 | 0 |
| 2 | 2.4 |
| 3 | 2.6 |
| 4 | 5.4 |

A biounit (BU) is that amount of antibotic when dissolved in 0.08 ml. of the test solution and applied to a 12.7 mm. paper disc, gives a 20 ml. zone of inhibition under standard microbiological conditions.

(B) Recovery

The whole broth from an alamethicin fermentation, as described above, was slurried with 3% of its weight of diatomaceous earth and filtered. The filtered beer was adjusted to a pH of 4.60 with 37% hydrochloric acid. Diatomaceous earth (1% of the weight of the filtered beer) was added and the slurry was filtered to approximate dryness. The filter cake was then extracted twice with ⅛ volume of acetone based on filtered beer volume. The acetone extracts were collected and concentrated with intermittent addition of water to an aqueous at reduced pressure. The remaining concentrate was then freeze-dried to yield a dry product of alamethicin. The recovery process, described above, gave the following balance sheet on an almethicin fermentation broth:

| Description | Amount | Assay* |
|---|---|---|
| Whole beer | 1,600 ml | 5 biounits/ml. |
| Filtered beer | 850 ml | 5.4 biounits/ml. |
| First acetone extract | 63 ml | 34 biounits/ml. |
| Second acetone extract | 106 ml | 8.6 biounits/ml. |
| Dry preparation of alamethicin | 2.72 grams | 1 biounit/mg. |

**S. lutea* assay, as described previously.

(C) Purification

A crude preparation (5 grams) of alamethicin, as obtained above, was dissolved in 100 ml. of 95% ethanol by warming to about 40° C. This solution was then treated with activated charcoal in an amount sufficient to decolorize the solution. Diethyl ether was then added to the decolorized solution in an amount sufficient to cloud the solution. The solution was then refrigerated overnight. Resulting crystals were recovered by filtration. Recrystallization was accomplished by dissolving the crystals in alcohol and adding ether as above; yield 1.3 grams of crystalline alamethicin.

EXAMPLE 2

Sodium Alamethicin

Alamethicin (1.0 gm.), as prepared in Example 1, can be dissolved in 6 ml. of absolute ethanol and to the solution can be added an equimolar amount of dilute sodium hydroxide until the pH of the solution is in the range 7–8. The solution can then be freeze-dried to provide a dry preparation of sodium alamethicin.

CHARACTERIZATION OF ALAMETHICIN

Alamethicin is a polypeptide having the following characteristics:

Elemental analyses: Found: C, 54.89; H, 8.21; N, 15.66.

Molecular weight: 1755–1770 (calculated from amino acids present in molecule).

Optical rotation: $[\alpha]_D^{25} = -5.0°$ (0.86% in alcohol).

Titration: pKa′=5.5.

Amino acid analysis: Following is a list of the amino acids which were present in a crystalline preparation of alamethicin analyzed by the method of Spackman, Stein, and Moore, *Anal. Chem. 30*, 1190 (1958).

| Amino acid: | Mole equivalents |
|---|---|
| Proline | 2 |
| Glycine | 1 |
| Alanine | 2 |
| Valine | 2 |
| Leucine | 1 |
| Glutamic acid | 1 |

Also, two mole equivalents of glutamine (amide of glutamic acid) was present.

Using the procedure following, 2-methyl alanine (8 mole equivalents) was isolated from crystalline alamethicin.

Crystalline alamethicin (2.5 grams) was hydrolyzed with 6 N hydrochloric acid for 60 hours. The hydrolyzed product was chromatographed on a column of Dowex-1 (strongly basic, anion exchange resin of the quaternary ammonium type) prepared according to the procedure disclosed in the publication by C. H. W. Hirs, S. Moore, and W. H. Stein, *JACS 76*, 6063 (1954). The pool of mono-amino and mono-dicarboxylic acids which came off the column first were chromatographed on a column of Dowex-50 (a polystyrene nuclear sulfonic acid resin) which was prepared according to the C. H. W. Hirs et. al. procedure, referred to above. 2-methyl alanine was isolated from the column and identified by comparison of infrared spectra and NMR spectrum with an authentic sample of 2-methyl alanine.

Ultraviolet spectrum: Alamethicin shows only end absorption in either alcoholic 0.01 N acid or base.

Solubility: Alamethicin is soluble in methanol, ethanol, and like alcohols; chloroform, methylene chloride, and like halogenated hydrocarbons; acetone, methyl ethyl ketone, isopropyl butyl ketone, and like lower alkanones; it is slightly soluble in ethyl acetate, amyl acetate, butyl acetate, and like aliphatic esters; and relatively insoluble in its free acid form in water. However, the sodium salt of alamethicin is very water-soluble.

Infrared spectrum: The infrared absorption spectrum of alamethicin suspended in mineral oil mull is reproduced in the drawing. Alamethicin shows peaks at the following wave lengths expressed in reciprocal centimeters:

| | |
|---|---|
| 3450 (M) | 1410 (M) |
| 3310 (S) | 1380 (S) |
| 3050 (M) | 1362 (M) |
| 2850 (S) (oil) | 1295 (M) |
| 2920 (S) (oil) | 1218 (M) |
| 2850 (S) oil) | 1190 (M) |
| 1720 (M) | 1170 (M) |
| 1650 (S) | 1097 (W) |
| 1535 (S) | 1042 (W) |
| 1462 (S) | 920 (W) |
| 1415 (M) | 698 (W) |

Band intensities are indicated as "S," "M," and "W," respectively, and are approximated in terms of the backgrounds in the vicinity of the band. And "S" band is of the same order of intensity as the strongest band in the spectrum; "M" bands are between one-third and two-thirds as intense as the strongest band, and "W" bands are less than one-third as intense as the strongest band. These estimates are made on a basis of a percent transmission scale.

Antiprotozal activity

Alamethicin inhibits the growth of *Tetrahymena pyriformis* and *Ochromonas danica*.

Antifungal activity

Alamethicin inhibits the growth of the following fungi on an agar dilution plate assay:[1] *Nocardia asteroides, Blastomyces dermaitidis, Coccidioides immitis, Hormodendrum compactum, Histoplasma capsulatum, Trichophyton rubrum, Trichophyton asteroides,* and *Trichophyton mentagrophytes*.

---

[1] The test compound is incorporated in agar in Petri dishes at concentrations of 1, 10, 100 and 1000 mcg./ml. Suspensions of the test fungi are streaked on the agar surface. After incubation for 72 hours at 28° C., the Petri dishes are examined and the degree of inhibition of growth observed.

We claim:

1. A composition of matter assaying at least 5 biounits/ml. of alamethicin, a compound which
    (a) is effective in inhibiting the growth of various Gram-negative and Gram-positive bacteria; and in its essentially pure crystalline form;
    (b) is soluble in methanol, ethanol, chloroform, methylene chloride, acetone, methyl ethyl ketone; slightly soluble in ethyl acetate, amyl acetate; relatively insoluble in water in its free acid form, and very soluble in water in its sodium salt form;
    (c) has the following elemental analyses: C, 54.89; H, 8.21; N, 15.66;
    (d) has an optical rotation $[\alpha]_D^{25} = -5.0°$ (0.86% in alcohol);
    (e) has a molecular weight of 1755–1770;
    (f) has a titration value of pKa′ 5.5; and
    (g) has a characteristic infrared absorption spectrum as shown in the accompanying drawing.

2. The composition of matter of claim 1 in dry form, said composition of matter assaying at least 1 biounit/mg.

3. The compound, alamethicin, according to claim 1, in its essentially pure form.

4. The compound, alamethicin, according to claim 1, in its essentially pure crystalline form.

5. A compound selected from the group consisting of alamethicin, according to claim 1, and salt thereof with alkali metal, alkaline earth metal, or amine.

6. The composition of matter of claim 1 in the form of its sodium salt.

7. A process for making the compound defined in claim 1 which comprises cultivating *Trichoderma viride* NRRL 3199 in an aqueous nutrient medium under aerobic conditions until substantial activity is imparted to said medium by production of alamethicin, and isolating alamethicin from the culture medium.

8. A process according to claim 7 which comprises cultivating *Trichoderma viride* NRRL 3199 in an aqueous nutrient medium under aerobic conditions until substantial activity is imparted to said medium by the production of alamethicin.

9. A process according to claim 7 which comprises cultivating *Trichoderma viride* NRRL 3199 in an aqueous nutrient medium containing a source of assimilable carbohydrate and assimilable nitrogen under aerobic conditions until substantial activity is imparted to said medium by the production of alamethicin, and isolating the alamethicin so produced.

10. A process according to claim 9 in which the isolation comprises filtering the medium, adjusting the filtrate to an acidic pH, adding diatomaceous earth to the acidified filtrate, filtering the resulting slurry, extracting the resulting filter cake, and recovering alamethicin from the solvent extracts.

References Cited

The Pfizer Handbook of Microbial Metabolites (1961), pp. 463, 612.

JEROME D. GOLDBERG, Primary Examiner

U.S. Cl. X.R.

195—81